United States Patent [19]

Layer et al.

[11] Patent Number: 5,493,913

[45] Date of Patent: Feb. 27, 1996

[54] POWER-IMPACT OR PULSE SCREWING METHOD

[75] Inventors: August Layer, Öhringen; Hans Rudolf, Sulzbach; Bernd Grammer, Beilstein; Heinz Veitinger, Murrhardt, all of Germany

[73] Assignee: Robert Bosch GmbH, Stuttgart, Germany

[21] Appl. No.: 328,186

[22] Filed: Oct. 24, 1994

[30] Foreign Application Priority Data

Oct. 26, 1993 [DE] Germany ............ 43 36 465.9

[51] Int. Cl.[6] .............. B25B 23/14; B25B 21/00
[52] U.S. Cl. .............. 73/761; 73/814; 73/847
[58] Field of Search .............. 73/650, 761, 814, 73/847, 854, 856, 860

[56] References Cited

U.S. PATENT DOCUMENTS

| | | | |
|---|---|---|---|
| 3,939,920 | 2/1976 | Hardiman et al. | 73/847 |
| 3,969,810 | 7/1976 | Pagano | 29/407 |
| 4,104,780 | 8/1978 | Sigmund | 73/761 |
| 4,163,310 | 8/1979 | Sigmund | 73/761 |
| 4,358,735 | 11/1982 | Boys | 324/208 |
| 4,361,945 | 12/1982 | Eshghy | 73/761 |
| 4,375,120 | 3/1983 | Sigmund | 73/761 |
| 4,375,123 | 3/1983 | Ney | 73/761 |
| 4,400,785 | 8/1983 | Wallace et al. | 73/761 |
| 4,562,746 | 1/1986 | Petit | 73/862.23 |
| 4,608,872 | 9/1986 | Mayer et al. | 73/862.23 |
| 4,845,998 | 7/1989 | De Martelaere et al. | 73/761 |
| 5,018,988 | 5/1991 | Kibblewhite et al. | 73/761 |
| 5,216,622 | 6/1993 | Kibblewhite et al. | 73/761 |
| 5,220,839 | 6/1993 | Kibblewhite | 73/761 |

FOREIGN PATENT DOCUMENTS

| | | |
|---|---|---|
| 0119928 | 9/1984 | European Pat. Off. . |
| 0133557 | 2/1985 | European Pat. Off. . |
| 0460920 | 12/1991 | European Pat. Off. . |
| 0552990 | 7/1993 | European Pat. Off. . |
| 2090976 | 7/1982 | United Kingdom . |

*Primary Examiner*—Richard Chilcot
*Assistant Examiner*—George M. Dombroske
*Attorney, Agent, or Firm*—Kenyon & Kenyon

[57] ABSTRACT

A method for tightening a screw utilizes a power-impact or pulse driver. The prestressing force in the screw to be tightened is increased step-by-step during the tightening operation and evaluated. By detecting the prestressing force in the screw on a step-by-step basis, the step heights pertaining to the increase in the prestressing force and the change in the step heights are used as criteria for the screw-coupling quality and for controlling the screw-coupling operation. In the same way, the number of impacts or pulses is also used as a criterion for the screw-coupling quality and for controlling the screw-coupling operation.

9 Claims, 3 Drawing Sheets

POWER-IMPACT OR PULSE SCREWING METHOD

FIELD OF THE INVENTION

The present invention relates to a method for tightening a screw utilizing a power-impact or pulse driver.

BACKGROUND OF THE INVENTION

It is known to tighten a screw, for example, until the yield point is reached. In this case, the torque to be expended is measured, for example, by means of a torque sensor or through the power consumption of the drive motor, and the screwing operation is stopped when a specified limiting value is reached.

When power-impact or pulse drivers are used, however, a torque measurement is very inaccurate. For example, given the pulse-by-pulse torque build-up of the power-impact or pulse driver, the static friction between the screw head and the bearing face must be overcome in each case. This variation between static friction and dynamic sliding friction invalidates the effective torque for tightening the screw. As a result, the actual tightening torque of the screw is virtually unknown and, in addition, the tightening torque is influenced quite heavily by the power-impact and pulse driver. Accordingly, the prestressing forces in the screw also fluctuate quite heavily.

SUMMARY OF THE INVENTION

In contrast, the advantage of the method according to the present invention is that because the prestressing force of the screw is detected during the screw-coupling operation, the friction at the screw head and the thread only plays a subordinate role. According to the present invention, virtually the only force detected is the force in the screw which produces a strain when the screw is tightened. Thus, costly measuring methods for determining the prestressing force are not needed. The special advantage attained in this case is that the prestressing force increases step-by-step in the case of power-impact and pulse drivers. This step-by-step increase can be used as new information for controlling the screwing operation, as well as for plausibility considerations.

The method according to the present invention is especially advantageous in that the prestressing force of the screw can be detected by means of a strain gauge or a piezoelectric sensor that is preferably mounted on the screw head or on the screw device. Varying the resistance value results in a sudden change in the resistance for every torque pulse, which can be simply measured.

The prestressing force in the screw can be detected quite reliably and advantageously using the ultrasound echo-time measuring method, in which the propagation time of ultrasonic longitudinal or transverse waves injected into the screw is measured. The time intervals between the received reflection signals are a direct measure of the prestressing force in the screw.

An especially simple control is achieved in the method according to the present invention when the torque pulses are counted for a specific prestressing force, thus allowing the tightening of the screw to be controlled with simple circuit components. In particular, by combining this with the measurement of the prestressing force, a plausibility check can also be simply performed. In this manner, errors can be avoided during the screw-coupling operation and the functional reliability of the screw-coupling operation can be advantageously monitored.

Since the prestressing force changes abruptly at every torque pulse, it is able to be reliably detected. By detecting the change from pulse to pulse, it is easy to discern whether the screw has reached the yield point, since the step height from one pulse to the next initially decreases and then increases again due to the plastic deformation of the screw.

Combining the measurement of the prestressing force and the counting of the steps, or rather of the torque pulses, advantageously results in a simple check test of the measurement and count values. A significant deviation signifies a faulty measurement of the prestressing force.

In addition, in the method according to the present invention, a display is advantageously provided for the power-impact or pulse driver, where the actual value of the physical parameter and/or of the shut-off value can be read out. For example, light-emitting diodes or other indicators allow a read out on the display of whether the screw-coupling operation is in order (IO screw-coupling) or not in order (NIO screw-coupling). Errors made during inputting or when tightening the screw are also easily and advantageously revealed.

DETAILED DESCRIPTION OF THE INVENTION

Figure 1:
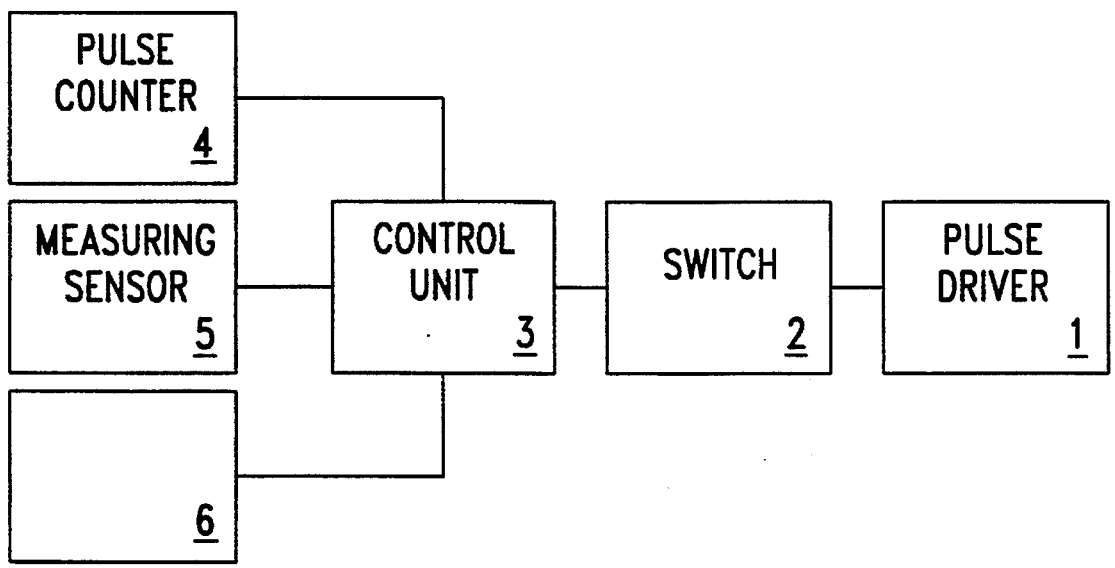
FIG. 1 illustrates a block diagram of a screw device according to the present invention.

FIG. 1 illustrates a block diagram of a power-impact or pulse driver 1 having a control unit 3, which is linked via a final controlling element or a switch 2 to the power-impact or pulse driver 1. The control unit 3 contains measuring electronics for measuring the screw parameters, which are connected to one or more measuring sensors 5, as well as to a pulse counter 4. The pulse counter 4 is designed as a counter and counts those individual torque pulses which are being applied to the screw and which serve to build up a prestressing force.

The measuring sensor 5 works, for example, according to the ultrasound echo-time measuring method and continuously transmits a longitudinal and/or transverse wave with a 1 ... 10 KHz repetition frequency into the screw head. These ultrasonic waves are reflected, received by the measuring sensor 5, and converted into an electrical signal. In each case, the measuring electronics measures the propagation time of the ultrasonic wave through the screw.

After each torque pulse, the propagation time changes abruptly since the prestressing in the screw also undergoes a sudden change. An example of the ultrasound echo-time measuring method is described in Great Britain Patent Application No. 2 090 976 A and European Patent Application No. 460 920 A1. In addition, it is well known to one skilled in the art to use strain gauges to detect small linear variations. Furthermore, there are known sensors capable of detecting screw deformation. Suitable sensors are also piezoelectric sensors, for example, which show a change in resistance that corresponds with the piezoelectric effect.

The control unit 3 preferably contains a microprocessor with a memory device and a corresponding input/output, as well as a generally known motor control unit for the screw device. The control unit 3 also contains the requisite measuring electronics, such as amplifiers, echo-time measuring devices, etc. The power-impact or pulse driver is controlled by means of the final controlling element 2.

A power-impact or pulse driving motor 1 is usually driven with compressed air, the impact mechanism being capable of being driven either mechanically by notching discs or hydraulically by a pressure cylinder. Such screw tools are used, for example, in auto repair shops to loosen or tighten lug nuts. What is disadvantageous about these tools, however, is that when the screw is tightened, it is extremely difficult to accurately determine the torque, since the static friction must be overcome anew with every impact or pulse. In practice, this means that after a lug nut is tightened, it must be tightened up once more by hand using an articulated wrench.

Figure 2A:
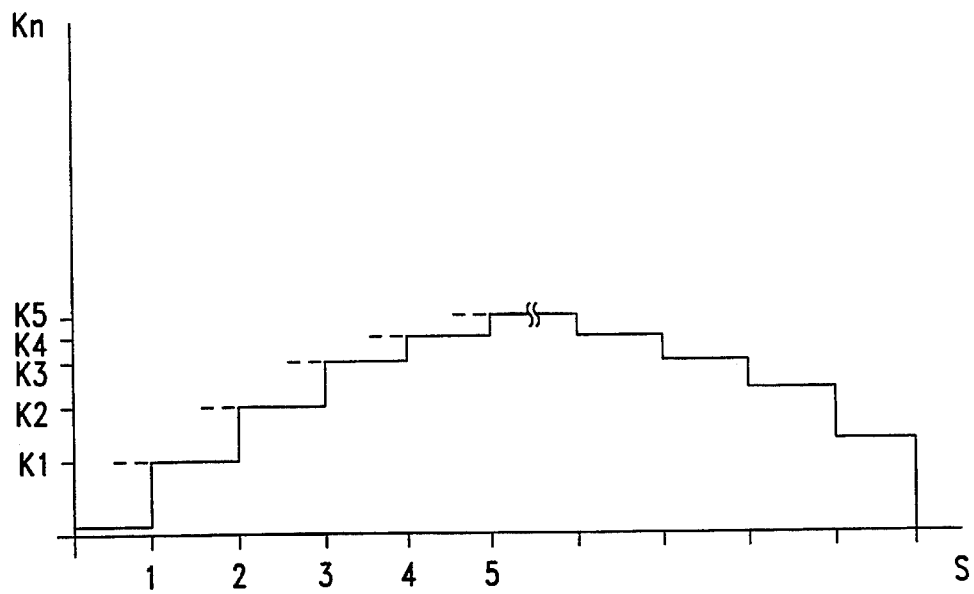
FIG. 2a shows a diagram in which the prestressing force is plotted schematically over the torque pulse number according to the present invention.

FIG. 2a depicts a diagram in which the prestressing force K is plotted schematically over the torque-pulse number. The prestressing force was calculated in this case by means of a microprocessor, for example, from the change in the ultrasound propagation time (echo time) or from a change in the resistance, calibration factors being considered as well. This curve applies, of course, only for a specific screw tool and for a specific screw of a predetermined length, diameter or material.

The prestressing force K of the screw is virtually zero until the head rests against the surface. If, after that, a first torque pulse S1 follows, then the prestressing force increases suddenly to the value K1. At the next impact or pulse S2, the force increases to the value K2, etc., until the force K5 is reached in step S5, for example. As can be inferred from the diagram, the sudden change in amplitude from one impact or pulse S to the next impact or pulse S+1 is not proportional and attains smaller values at a higher total number of impacts or pulses. The smaller values signify that the holding (static-friction) torque slowly becomes as great as the angular momentum of the screw tool or that the material stressing of the screw reaches the range of plastic deformation.

When the marginal conditions are more accurately known, a statement can be made about the cause of the declining values, or the pure measured values must be considered. Thus, predetermined values can be specified for a specific screw connection, advantageously filed in the memory device of the control unit 3, and then used for the triggering operation.

Figure 2B:
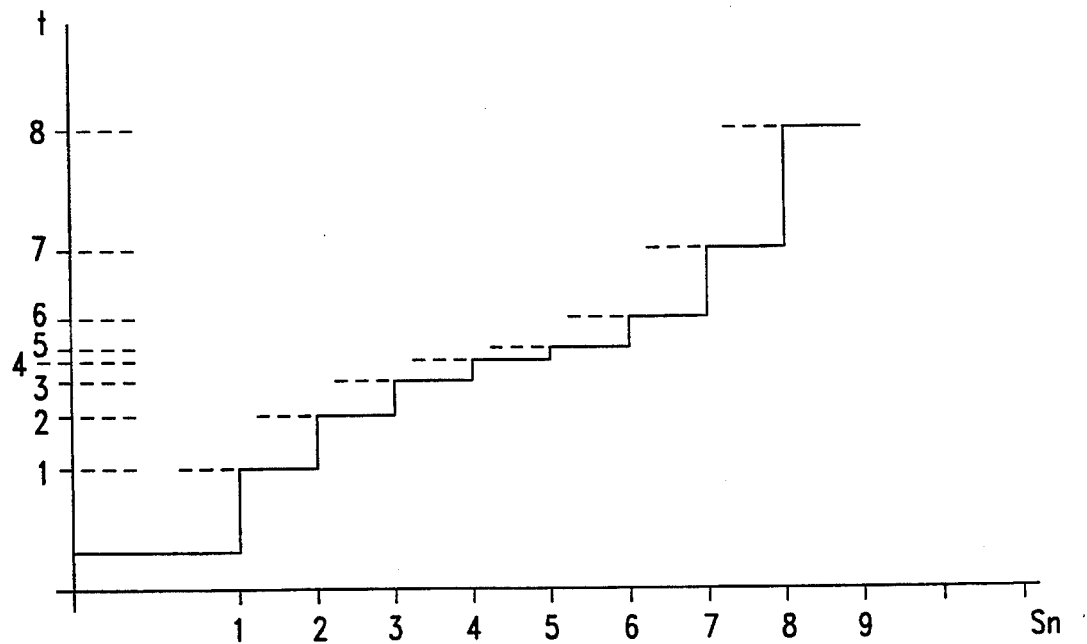
FIG. 2b shows a diagram in which the ultrasound propagation time and resistance value is plotted over the torque pulse number according to the present invention.

FIG. 2b depicts a diagram in which the measured variable ultrasound propagation time and resistance value are plotted over the torque pulse number. The exact curve characteristic depends, of course, quite heavily on the screw tool being used and the screw connection.

The sudden amplitude changes in the measured values initially decrease in the elastic material-stressing range of the screw. If the screw is tightened beyond the yield point, then the sudden amplitude changes increase, because a disproportionately larger expansion of the screw is caused with every torque pulse in the plastic stressing range. The control unit 3 advantageously monitors the respective change values and thus can reliably recognize the transition from the elastic to the plastic range. The change values provide still further evidence about the screw connection, for example information about the hardness of the particular screw case.

According to the simplified method of the present invention, once this curve characteristic has been detected, the same screw type can be tightened up to the permissible limiting value K5. The advantage of the ultrasound echo-time measuring method of the present invention is that this value can also be controlled again later on, even when the screwing operation has long since ended.

Since the curve levels off with an increasing number of rotational pulses S, the attainment of the yield point can also be considered by evaluating the respective change in amplitude of the prestressing force K at every rotational pulse S. If the difference, for example K5–K4 reaches a specific minimal value, as depicted in step 5, then the difference or the ratio can be used to switch off the screwing operation.

The combination of the double detection of the prestressing force, once through the direct measurement according to the strain gauge method or the ultrasound method, in conjunction with the counting of the rotational pulses, has the advantage that errors in the screw device itself can be also checked by means of a simple plausibility consideration. Therefore, the screw device is able to monitor itself and, in the event of an error, can signal an alarm to the operator. For this purpose, a display is advantageously provided, which in addition to the screw-parameter values, can also output an alarm indication.

Figure 3:
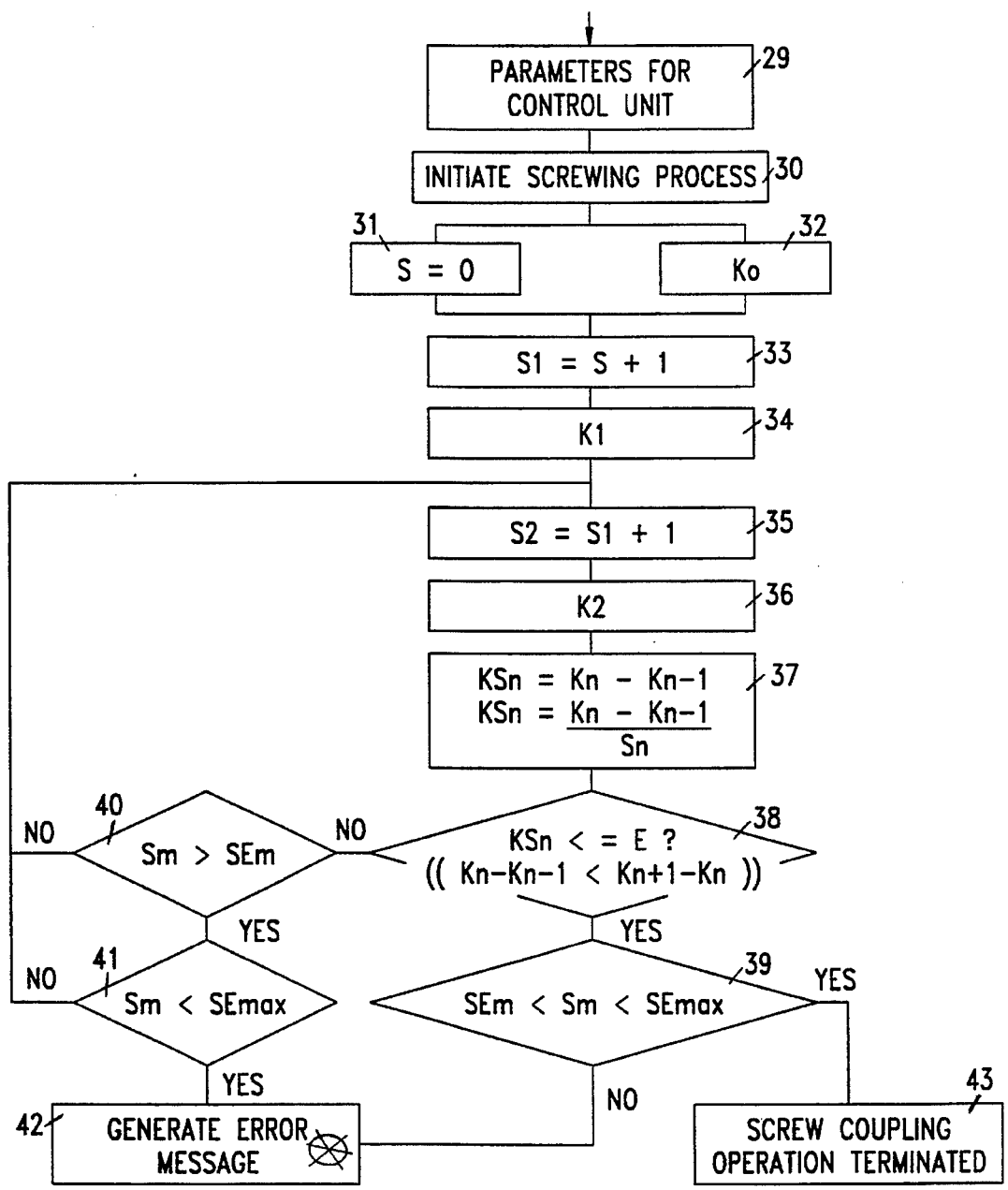
FIG. 3 illustrates a flow chart of the functional sequence for evaluation of the prestressing force and evaluation of the change in the measured value of a screw device according to the present invention.

On the basis of the flow chart of FIG. 3, the functional sequence is clarified in greater detail in the case of evaluation of the prestressing force and evaluation of the change in the measured value of the screw device. The essential parameters for the method according to the present invention are communicated in position 29 to the control unit 3 through an input interface. These are, for example: the change in measured value in the ultrasound propagation time or in the resistance of the strain gauge, as correspond to the desired prestressing force or of another strain-measuring sensor; the required torque-pulse number, including the permissible range until the desired prestressing force is reached; and the change in measured value which ensues given the prevailing marginal conditions and given the required prestressing force, and serves here as a switch-off interrupt parameter E.

In position 30, the power supply to the motor of the screwing tool is released and the screwdriver begins to screw the screw into place, at first without a build-up of prestressing force. At the same time, the pulse counter 4 is set to S=0 in position 31 to ensure defined start conditions. However, it is also possible for the counter to first be set to S=0 when there is a defined load threshold. Immediately after position 30, the measured-value acquisition is likewise begun at position 32 with a rate of repetition of between 10 and 10,000 measurements per second in accordance with one of the previously described methods, and the prestressing-force value KO is measured.

At this point, a first torque pulse S1=S+1 is introduced into the screw in position 33, and the prestressing force K1 is measured in position 34. In position 35, the rotational pulse S2=S1+1 is introduced into the screw and, at position 36, the corresponding measured values are determined and the prestressing force K2 is calculated.

A switch-off interrupt factor KSn is now produced in position 37 from the difference between the two prestressing forces K2–K1, either in relationship or not in relationship to the torque pulse 2. A query is made in position 38 to determine whether KSn is smaller than or equal to the switch-off parameter E.

KSn is defined in this case as the differential value $KSn = Kn - K_{n-1}$ or as the ratio value $KSn = \dfrac{Kn - K_{n-1}}{Sn}$ , where n represents the number of torque pulses already introduced into the screw.

If Ksn is not smaller than or equal to the switch off parameter E, the tightening operation continues as from position 35, i.e., another torque pulse is introduced into the screw. This cycle proceeds until the switch-off value E is reached in position 38. When the switch off value E is reached, it is checked at position 39 to determine whether the torque-pulse number lies within the specified range. If the torque-pulse number is within the specified range, the screw-coupling operation is terminated at position 43, and a new screwing operation can begin. If the pulse-torque number lies outside of the specified range, an error message can then follow.

In a further refinement of the present invention, in parallel to the previously described method, another query can be made after position 38 in position 40 to determine whether the torque-pulse number Sm is greater than a minimal, specified switch-off torque pulse number SEm. If Sm is not greater than SEm, the functional sequence can be continued at position 35. A query is then made at position 41 to determine whether the torque-pulse number Sm is greater than a maximum, specified switch-off torque-pulse number SEmax. If Sm is greater than SEmax, then an error of the screw device is to be assumed. In this case, the screwing device is then switched off, and an error signal is output. If Sm is not greater than SEmax, the screw-coupling operation is continued from position 35.

In another further refinement of the present invention, at position 38, for example, the control unit can monitor whether the change-in-measured-value steps (change in ultrasound propagation time echo time or change in resistance) initially decrease and then increase again. This information, i.e., how the measured-value stages change during the tightening operation, can also be drawn upon to terminate the screw-coupling operation.

The plausibility tests can also be performed here as already described.

The screw-coupling operation would then be ended when (Kn −(Kn−1))<((Kn+1)−Kn). Certain tolerances must be considered in this case in the differences. Transitions from the elastic to the plastic material-stressing range can thus be recognized.

What is claimed is:

1. A method for tightening a screw, comprising the steps of:

applying individual torque pulses to the screw via one of a power impact driver and a pulse driver, thereby tightening the screw in a step-by-step manner;

detecting, via an ultrasound echo-time measurement, at least one screwing parameter as a physical quantity indicating deformation of the screw; and switching-off the one of the power impact driver and the pulse driver as a function of the detected at least one screwing parameter when the at least one screwing parameter indicates a change in the physical response of the screw.

2. The method according to claim 1, wherein the at least one screwing parameter includes a prestressing force of the screw.

3. The method according to claim 2, further comprising the step of, after applying a first individual torque pulse, calculating a change in the prestressing force after each of the individual torque pulses, wherein the at least one screwing parameter includes the change in the prestressing force.

4. The method according to claim 2, further comprising the steps of:

counting a number of individual torque pulses applied to the screw until switch-off of the one of the power impact driver and the pulse driver;

performing a first plausibility check via a first comparison of the number of individual torque pulses with a first predetermined value; and performing a second plausibility check via a second comparison of the prestressing force corresponding to each of the number of individual torque pulses applied to the screw until switch-off with a second predetermined value.

5. A screwing device for tightening a screw, comprising:

one of a power-impact and a pulse driver for applying a number of individual torque pulses to the screw, thereby tightening the screw in a step-by-step manner;

an ultrasound echo-time measurement sensor, connected to one of the Dower-impact driver and the pulse driver, for measuring a pre-stressing force on the screw; and a control unit connected to one of the power-impact driver and the pulse driver, the control unit including a computing device for determining a switch-off value for switching-off the one of the power-impact driver and the pulse driver when the pre-stressing force indicates a change in physical response of the screw, and an input device for receiving the switch-off value and at least one data output.

6. The screwing device according to claim 5, further comprising an additional measuring sensor connected to the one of the power-impact and the pulse driver for counting the number of individual torque pulses applied by the one of the power-impact driver and the pulse driver to the screw.

7. The screwing device according to claim 6, wherein the control unit generates an alarm signal when the number of individual torque pulses exceeds a predetermined value.

8. The screwing device according to claim 5, further comprising a display connected to the one of the power-impact driver and the pulse driver for displaying an actual value of at least one of the prestressing force and the switch-off value.

9. The screwing device according to claim 8, wherein the display indicates one of a good-screw-coupling operation message and a poor-screw-coupling operation message.

\* \* \* \* \*